Figure 4:
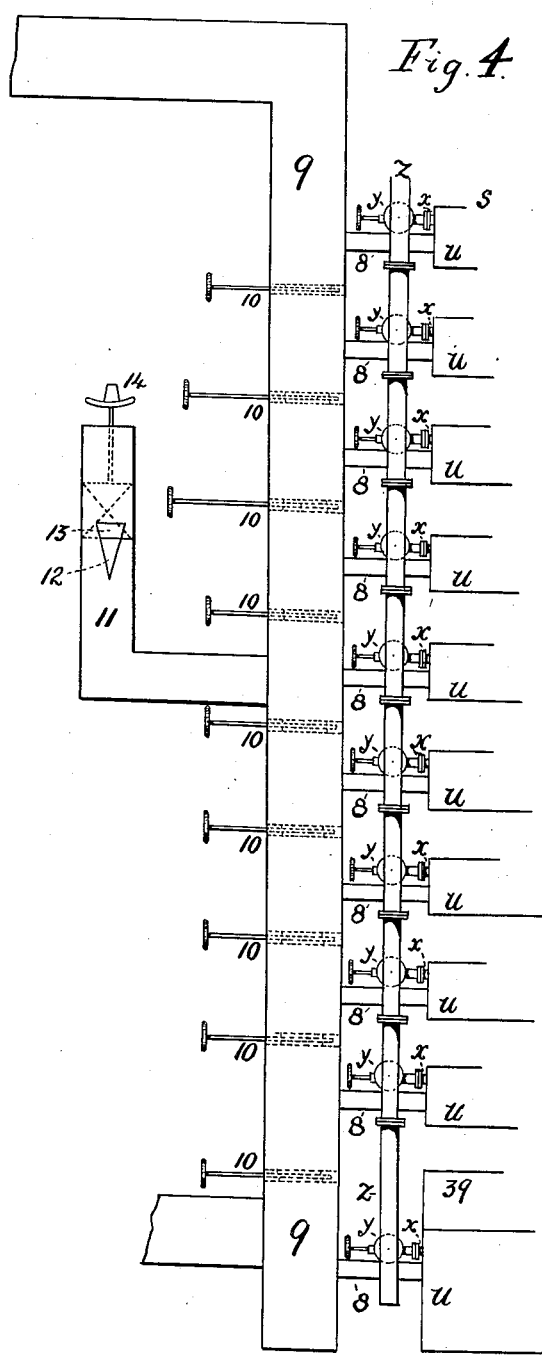

No. 809,218. PATENTED JAN. 2, 1906.
R. P. PICTET.
APPARATUS FOR THE SEPARATION OF GASES FROM THEIR MIXTURES.
APPLICATION FILED MAY 24, 1901.
5 SHEETS—SHEET 1.
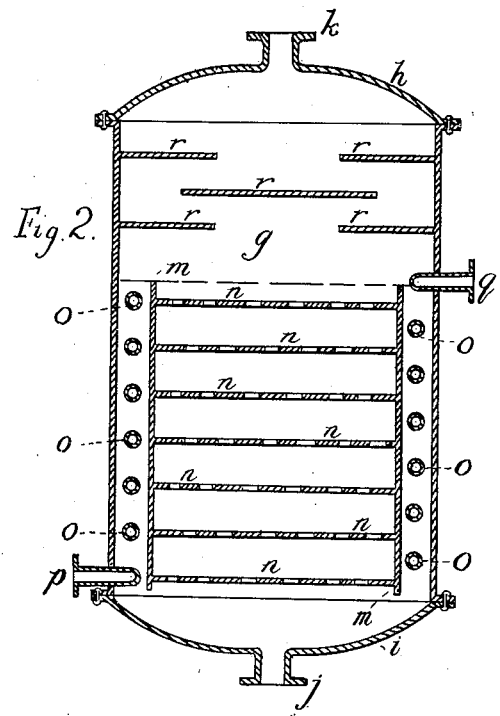
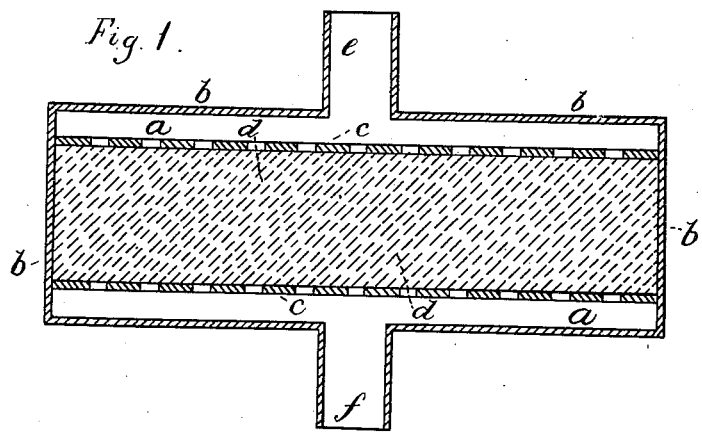
Witnesses:
Benj. E. Teale
H. H. Perles
Inventor.
R. P. Pictet
By E. M. Marbledon
Attorneys.

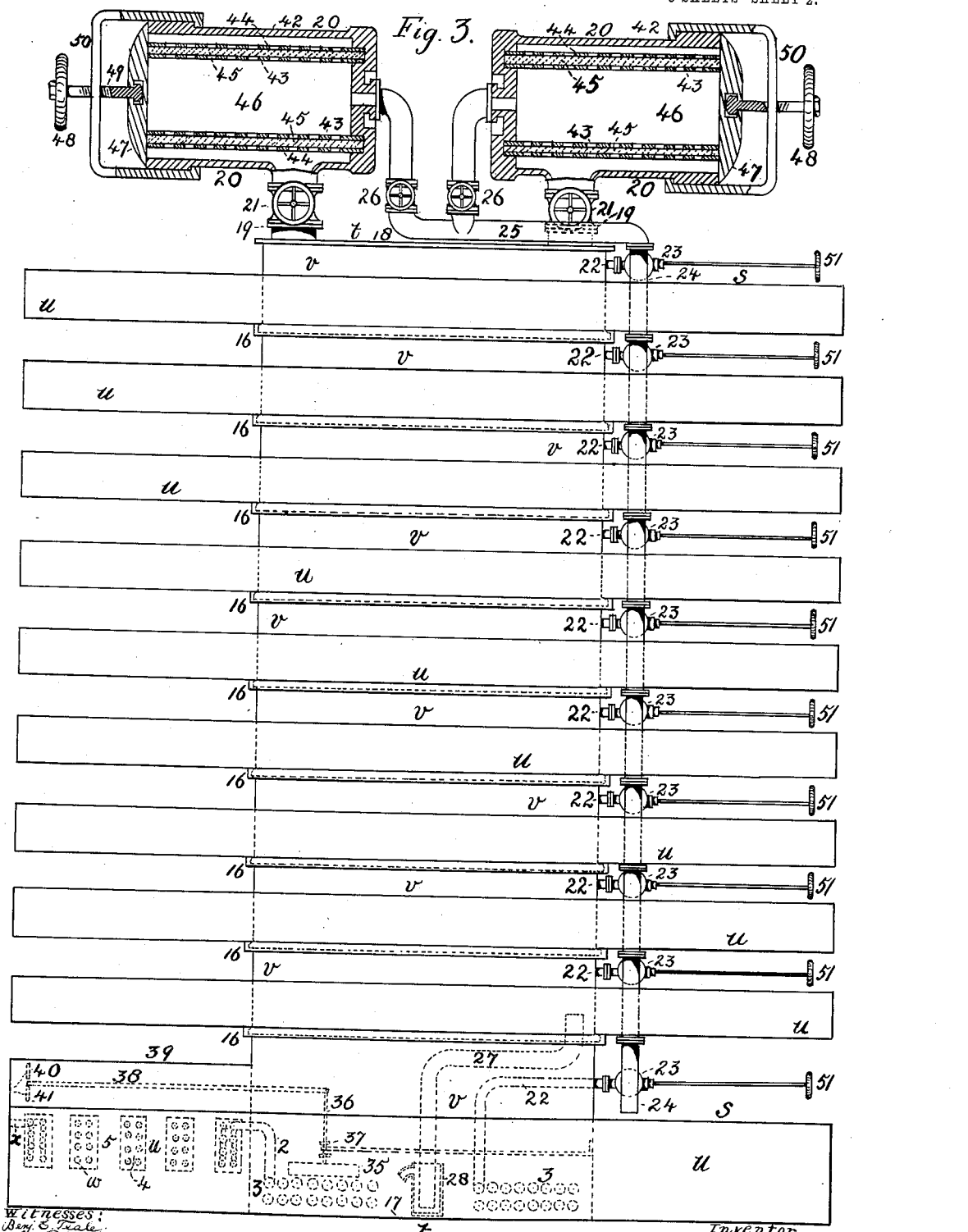

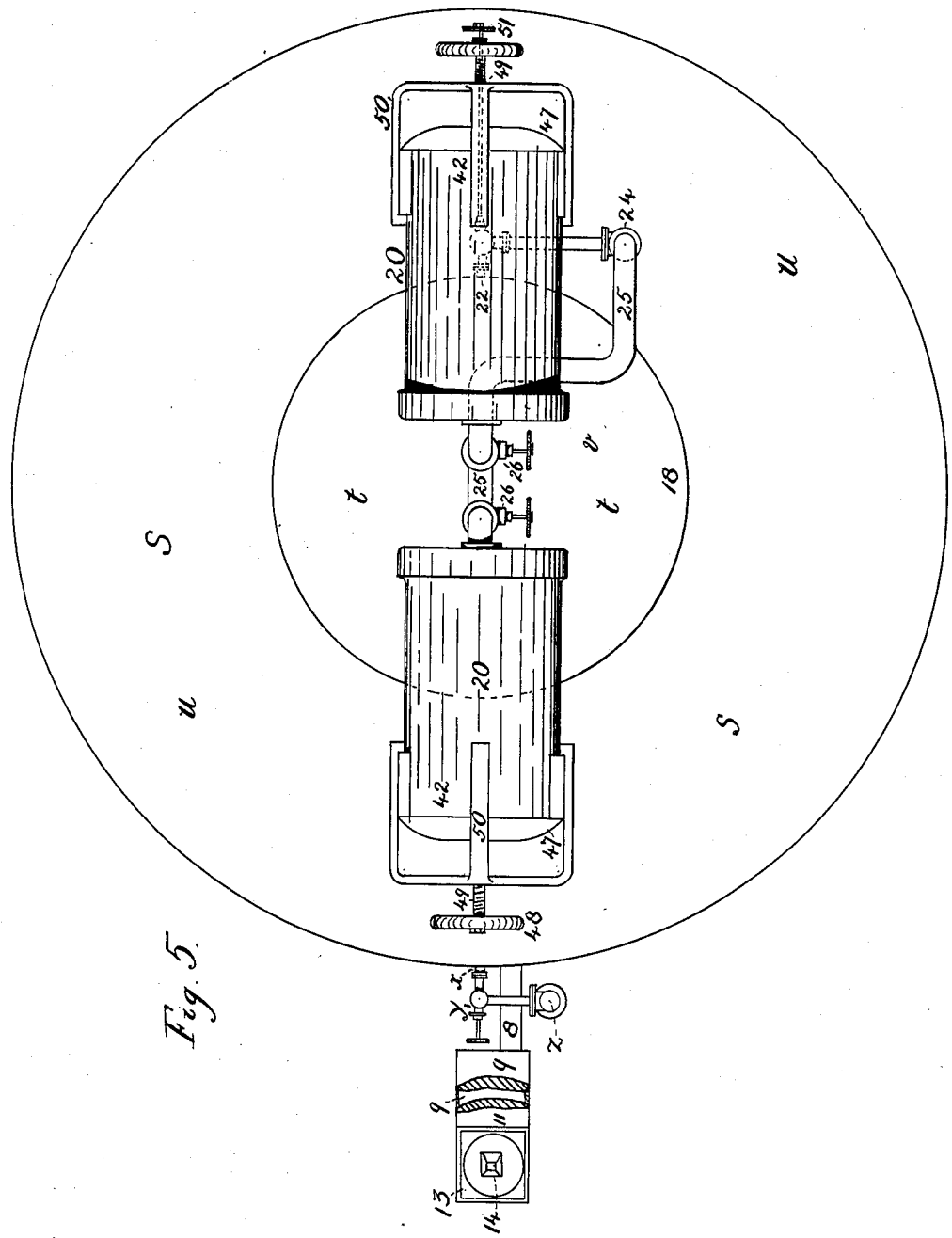

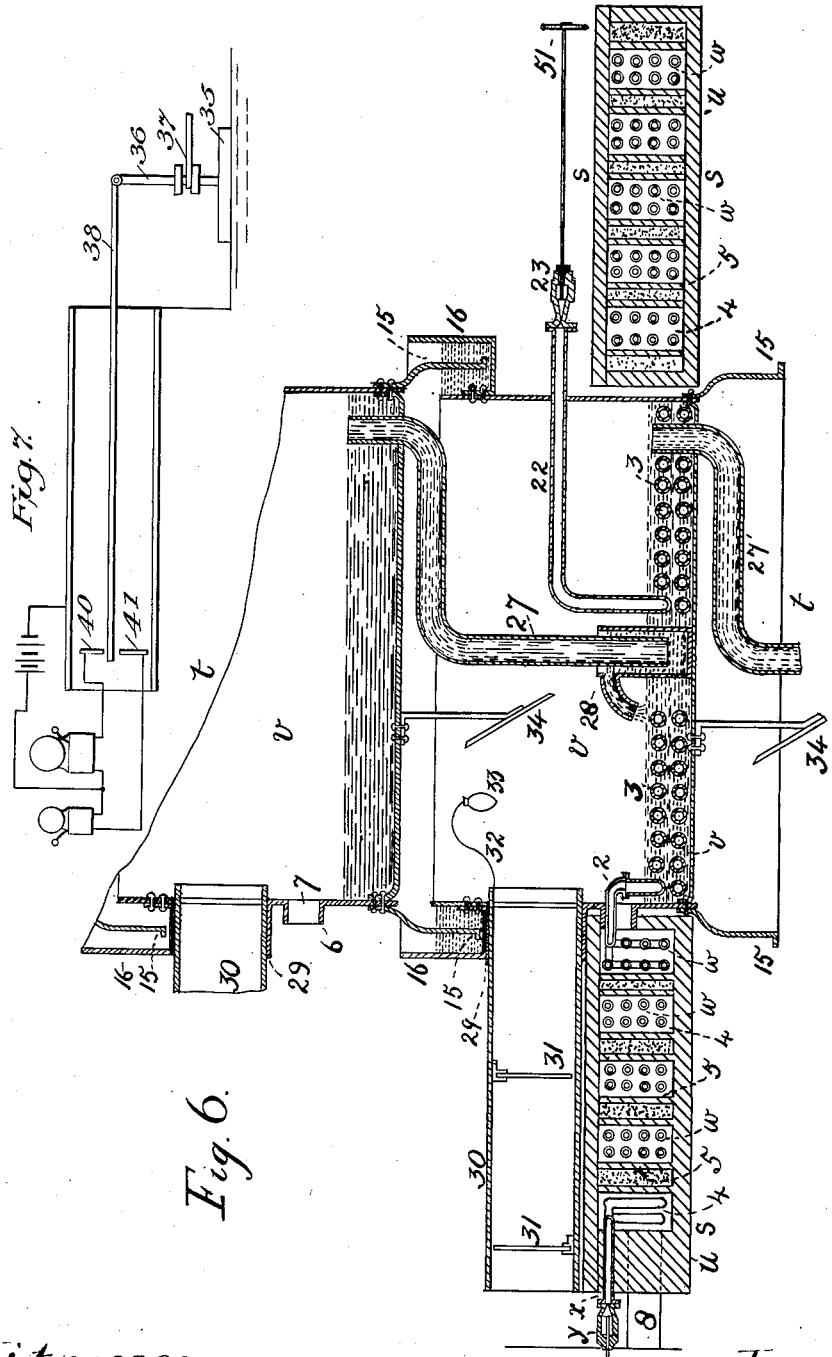

UNITED STATES PATENT OFFICE.

RAOUL PIERRE PICTET, OF BERLIN, GERMANY.

APPARATUS FOR THE SEPARATION OF GASES FROM THEIR MIXTURES.

No. 809,218.	Specification of Letters Patent.	Patented Jan. 2, 1906.

Application filed May 24, 1901. Serial No. 61,723.

*To all whom it may concern:*

Be it known that I, RAOUL PIERRE PICTET, a professor of the University of Geneva and late professor of the University of Berlin, Germany, and manufacturer of chloroform at Berlin, Germany, a citizen of the Canton of Geneva, in the Confederation of Switzerland, and a resident of 14 Bendlerstrasse, Berlin, in the Kingdom of Prussia and Empire of Germany, have invented certain new and useful Improvements in Apparatus for the Separation of Gases from Their Mixtures, of which the following is a specification.

The object of this invention of improvements in apparatus for the separation of gases from their mixtures is the provision of arrangements of apparatus which shall enable the separation of gases, especially those forming the air, to be accomplished more economically than has been possible by the means hitherto provided and to enable the separation of gases to be effected completely or to any extent which may be desirable from time to time.

For convenience of description I will first describe my invention as applied in the separation of the elements constituting air.

In accomplishing the object of my invention I adopt the processes and arrangements following, namely: First, the atmospheric air to be separated into its constituent gases is first filtered, compressed, and freed from water in order that all the water-vapor which it contains and which is often considerable may be taken away; second, the dry and compressed air is cooled to the temperature of its point of liquefaction—namely, about $-194°$ centigrade; third, the condensed and liquefied air is filtered to remove the solid carbonic acid which it holds in suspension; fourth, the liquid and filtered air is evaporated again in order to separate first the more volatile constituent—namely, nitrogen—and afterward the less volatile constituent—namely, oxygen; fifth, evaporation of the liquid air is utilized for the liquefaction of the compressed air to be separated into its constituent gases; sixth, an automatic arrangement enabling the pressure of liquefaction to be regulated in order to insure a continuous working of the apparatus; seventh, an arrangement which without needing attention when once adjusted will permit the separated nitrogen and oxygen to leave the apparatus in such condition as to have the commercial or industrial value requisite from time to time and also to permit the escape of mixtures of gases too nearly resembling atmospheric air.

In the accompanying drawings, in all the figures of which the same letters of reference are employed to indicate corresponding parts, Figure 1 is a vertical section illustrating the arrangement of filter which I adopt according to this invention. Fig. 2 is a vertical section through a dehydrater of the kind employed according to this invention. Fig. 3 is a side elevation, partly in vertical section, illustrating the greater part of the two apparatus, which are, as hereinafter explained, conveniently termed the "exchanger" and "liquefier," arranged according to this invention. Fig. 4 is a side elevation which, taken in conjunction with Fig. 3, completes the illustration in side elevation of the said liquefier and exchanger. Fig. 5 is a plan of the said liquefier and exchanger. Fig. 6 is a vertical section, upon a larger scale than Figs. 3, 4, and 5, illustrating the internal arrangement of the said liquefier and exchanger. Fig. 7 is a diagram illustrating the use of a float and electric circuits and signaling devices for indicating fluctuations in the level of the liquid oxygen in the liquefier.

For the filtration of the air to be separated into its constituent gases I employ any suitable filtering material, cotton-wool being especially suitable for use and which is of importance, I do not allow the air to traverse the filtering material at too great a speed. In order that this may be efficiently accomplished, I provide a chamber to which the air to be operated upon is led in any suitable way, as by means of a pipe of any suitable material. The said chamber is provided with two or more partitions perforated or made of wire-gauze, so as to be divided into a suitable number of compartments, one or more of which is or are filled with cotton-wool or other suitable filtering material distributed and packed so uniformly that there are no parts through which the air can pass without being filtered. Two or more filters may be arranged so that one or more may be put into or out of action from time to time and so that the filtering material may be changed without interruption of the action of the other parts of the apparatus employed. A pipe or passage or pipes or passages of any suitable kind is or are provided to convey the filtered air to an apparatus by which it is to be compressed. A filter of the said kind is shown in Fig. 1 of the accompanying drawings, which shows a chamber $a$, formed in any suitable way with walls *b* of any suitable material and provided with two perforated partitions *c*, of wood or other suitable material, between which cotton-wool *d* is placed and arranged in the manner aforesaid. The chamber *a* is provided with an inlet-passage *e* and an outlet-passage *f*, the outlet-passage *f* being connected in any suitable way to the air-compressor or air-compressors with which the said filter is to be employed.

In order to compress the air, I may employ any suitable kind of air-compressor; but I prefer to employ a compressor or compressors in which water is injected into the air being compressed in order to keep the air as cool as possible.

In order to remove water from the compressed air, I employ a dehydrater or dehydraters, which forms or form a very important part of this invention. The dehydrater or dehydraters which I employ may be connected to refrigerating apparatus, which may be of any suitable kind, provided that the required reduction of the temperature of the air passed through the dehydrater or dehydraters is effected. In arranging a dehydrater according to this invention I provide a cylinder or vessel of any suitable material of strength sufficient to resist the maximum pressure to which the air passing into the dehydrater may be compressed. Within the said cylinder or vessel a casing is supported in any suitable manner, and this casing is provided with two or more horizontal or nearly horizontal perforated plates or partitions, and in the space between the said casing and the interior surface of the wall of the cylinder or vessel is placed a coil or series of pipes, through which is made to pass a suitably-cooled saline solution or any liquid not freezing or crystallizing at the low temperature which it is desired to maintain in the dehydrater or any volatile liquid which will be evaporated at such low temperature. Enough water or other liquid is placed in the cylinder or vessel to immerse the casing therein, and the air which has been compressed is made to enter the cylinder or vessel aforesaid at the bottom and to pass through the casing therein, being divided in passing through the plates or partitions of the said casing, so that a very intimate contact between such air and the water or other liquid takes place, and the air passing through the said casing reducing the density of the water or other liquid within it by change of temperature, as well as by the formation of bubbles therein, and impelling such water or other liquid mechanically causes an ample circulation of water or other liquid upward through the said casing and downward outside it and past the coil or pipes aforesaid, and thus the air passed into the dehydrator is washed and any water-vapor present in it is condensed to the maximum tension of water-vapor at the temperature of the liquid in the cylinder or vessel aforesaid. The air which has been cooled and freed from water-vapor, as aforesaid, is allowed to pass through a suitable outlet at the top of the cylinder or vessel aforesaid. A dehydrater of the said kind is shown in Fig. 2 of the accompanying drawings, in which *g* is a vessel or cylinder formed of metal plates with a cover *h* and bottom *i* riveted thereto. The bottom of the dehydrater *g* is provided with a flange *j* for the connection of the pipe, by means of which compressed air is to be supplied to the dehydrater in order to be freed from water, and the top of the dehydrater is provided with a flange *k* for the connection of the pipe by which air is to be conducted from the dehydrater. *m* is a casing supported in any suitable manner within the vessel or cylinder *g* and provided with a series of horizontal perforated partitions *n*. In the interior of the vessel or cylinder *g* and around the casing *m* is arranged a coil *o*, formed of a pipe the ends of which pass to the outside of the vessel or cylinder *g* and are provided with flanges *p q*, by means of which the coil *o* may be connected to the pipes by means of which the cooled saline solution or other liquid aforesaid may be led to and from it. In the upper part of the vessel or cylinder *g* are arranged baffle-plates *r*, placed so that the compressed air passing upward through the dehydrater will be compelled to take an indirect course. The vessel or cylinder *g* is filled with water or other suitable liquid sufficiently to immerse the casing *m* and the coil *o*, and for this to be possible it is obvious that the pipe through which compressed air is conducted to the dehydrater must be so curved that water or other liquid may not run out of the vessel or cylinder *g* should the air-compressor or air-compressors employed cease working at any time.

Compressed air being forced into the dehydrater at the bottom passes upward through the interior of the casing *m*, being divided in its passage through the partitions *n*, and so brought into intimate contact with the liquid in the dehydrater and so washed, while at the same time any water-vapor present in it is condensed to the maximum tension of water-vapor at the temperature of the liquid employed in the dehydrater. The upward passage of the compressed air through the casing *m* also causes, as already mentioned herein, an ample circulation of the liquid employed in the dehydrater.

I prefer to employ two dehydrators and so connect the outlet of the one to the inlet of the other that the air shall be passed through them both successively, the first being arranged to reduce the temperature of such air to about 0° centigrade and the second to further reduce the air to a temperature of from about −20° to about −40° centigrade. As a cooling agent for use in the second dehydrater at any rate either sulfurous acid or carbonic acid or ammonia or any similar liquid or any cooled saline solution or any other suitable volatile liquid may be employed, and in the cylinder or vessel of such second dehydrater I necessarily use instead of water any liquid not freezing at −20° or −40° centigrade, according to the temperature to be produced—such as glycerin, calcium-chlorid solution, petroleum, alcohol, or the like—and preferably a liquid with which water readily combines, so that the air passed through the dehydrater may be dried as thoroughly as possible. The purpose of thoroughly drying the air is to prevent water-vapor from being condensed in and obstructing the pipes in which the air is further cooled or liquefied.

The dehydrater above described forms the subject-matter of a divisional application for Letters Patent filed July 25, 1903, Serial No. 166,940.

In order to liquefy the air operated upon and then in causing it to assume the gaseous form again to separate it into its constituent gases, I use two apparatus which form very important parts of this invention. The object of one of these two apparatus being largely to enable the transfer of heat from some of the air to be liquefied to a part of the gas or mixture or gases produced by the evaporation of air which has been liquefied, this apparatus may conveniently be called the "exchanger," while the object of the other of the said two apparatus being to liquefy the air operated upon by using its heat to evaporate the liquid air and separate it into its constituents, this other apparatus may conveniently be called the "liquefier." The exchanger and the liquefier may be formed into one structure or may be made into two structures connected together in the manner requisite, but must be strong, easily accessible, easily erected and taken apart, and even while in use permit of the inspection, adjustment, and control of the operations proceeding in them.

The exchanger consists of a suitable number—say from four or five to twenty or more—pipes or groups of pipes through which the compressed air cooled and freed from water-vapor is made to pass. The said pipes or groups of pipes are arranged in a spiral or other convenient form and inclosed in channels of a corresponding arrangement formed or inclosed at the sides and above and below between walls of any suitable non-conductor of heat—such, for instance, as cotton, sawdust, tow, or cork or other suitable material inclosed within walls or shells of light sheet-iron or wood or other material. Each of the said pipes or groups of pipes is connected, by means of a passage provided with a suitable regulating valve, cock, or sluice to a pipe or conduit by which dried, cooled, and compressed air from the dehydrater or dehydraters may be supplied to it. Each of the said pipes or groups of pipes is also connected in any suitable way to a coil or pipe or group of coils or pipes in the liquefier, as will be hereinafter mentioned, and the channel inclosing each of the said pipes or groups of pipes is connected at one end with a gas-collector, which, with the subsidiary devices employed in conjunction with it, will be further described hereinafter, and at the other end, as will be hereinafter further explained, with one of the trays or troughs of the liquefier.

The liquefier in the form which I will describe by way of illustration is formed of a suitable number—say from four or five to twenty or more—of superposed trays or troughs of wrought-iron, copper, aluminium, wood, or other substance sufficiently strong and impervious to liquid air, and, except in the case of the top and bottom trays or troughs which are respectively closed at the top and the bottom in any suitable manner, each of the said troughs or trays is formed at its upper part or other suitable part with a channel or gutter to receive the lower edge of a corresponding part of the trough or tray above it, so that when the apparatus is erected this channel or gutter may be filled with water, which, freezing when the apparatus is put to work, will make a tight joint between each trough or tray and that or those next to it.

In the lower part of each trough or tray is arranged a coil or pipe or coils or pipes connected to one of the pipes or groups of pipes used in the exchanger. A pipe, which is provided with a cock or valve capable of being operated from outside the apparatus and is preferably arranged to communicate with a liquid-collector in communication with the coil or pipe or coils or pipes of each tray of the liquefier, is provided to enable the coil or pipe or coils or pipes of each tray or trough to communicate with a filter or filters for the removal of carbonic acid from the air liquefied in such coil or pipe or coils or pipes. Each trough or tray is so formed that it may be filled with liquid air to a depth sufficient to immerse the coil or pipe or coils or pipes in it to any suitable extent and is provided with an outlet pipe or passage arranged to extend downward so far toward the bottom of a vessel arranged or formed in the next lower trough or tray that the liquid air flowing down such pipe or passage shall fill the said vessel before being able to overflow into such lower trough or tray and shall so form a liquid seal to prevent gas from passing from one trough or tray to the next.

Each trough or tray is placed in communication in any suitable way with the channel inclosing one of the pipes or groups of pipes used in the exchanger, so that gas may pass from such trough or tray to the said channel. The troughs or trays may be round or square or oblong or of any other shape which may be convenient, and the joints between the troughs or trays may be of any suitable form instead of being made with ice in the manner hereinbefore described.

The liquid-collector, which is protected in any suitable way from receiving heat from outside the apparatus, or, if such liquid-collector be not employed, the pipe leading from the coil or pipe or coils or pipes of each trough or tray, is made to communicate with a filter or filters by means of which any solid carbonic acid which may be contained in the liquid air is removed therefrom. The or each filter for the removal of carbonic acid is formed of a cylinder or drum containing or surrounded by a layer or layers of filtering material, such as cotton-wool or filter-paper or any other suitable filtering agent suitably inclosed or supported, as by wire-gauze or perforated sheet metal or any other suitable means, and preferably two or more filters are employed, each being arranged in a separate chamber closed while the filter is in use, but capable of being opened for the inspection or emptying or changing of the filter therein. The liquid air to be filtered is supplied to each filter at the center thereof, so that the carbonic acid will be deposited in the form of snow against the walls of the filter and so collected and removed from time to time and prepared for use in any suitable way—as, for instance, by distillation in steel cylinders or by the compression of the carbonic-acid snow.

When two or more filters are provided, a valve or cock or valves or cocks of any suitable kind is or are provided, so that the liquid air to be filtered may be supplied to or shut off from each filter, so that the filters may be inspected, emptied, or changed, as may be desirable, from time to time without interruption of the working of the apparatus.

From the filter or filters the liquid air, freed from solid carbonic acid, is led to the upper trough or tray of the liquefier and allowed to pass successively through the troughs or trays thereof. In passing through the trays or troughs of the liquefier the liquid air washes the coil or pipe or coils or pipes in each tray or trough and receives heat therefrom, so that some of such liquid air is evaporated into gas, while the air passing through the said coil or pipe or coils or pipes loses heat and is liquefied. In the flow of the liquid air onto and through the several trays or troughs the nitrogen, being more readily evaporated, tends to assume the gaseous form before the oxygen, and so the gas evolved in the top tray or trough or the several upper trays or troughs will be entirely or principally nitrogen, while the gas evolved in the bottom tray or trough or the several trays or troughs near the bottom of the series will be entirely or principally oxygen, or, in other words, the gas evolved in each tray or trough will consist more entirely of nitrogen the higher the position of the tray or trough in the series and more entirely of oxygen the lower the position of the tray or trough in the series. From this it follows that from the tray or trough or trays or troughs in the center of the series will be evolved a mixture or mixtures of gases too nearly resembling atmospheric air to be used for the purpose for which either of the gases separated by the apparatus may be intended, and so, as will be hereinafter explained, means are provided for the escape or separate collection or other suitable treatment or use of the said mixture or mixtures of gases too nearly resembling atmospheric air.

It has been hereinbefore mentioned that the channel inclosing each pipe or group of pipes in the exchanger is made to communicate with a gas-collector. This gas-collector, which may be a large tube, preferably quadrangular and is preferably arranged vertically, is placed in communication at its upper end with a gas-holder for nitrogen or the mixture of gases rich in nitrogen which it may be desirable to collect and the lower end of such gas-collector is connected to a gas-holder for oxygen or the mixture of gases rich in oxygen which it may be desirable to collect.

The gas-collector is provided with a suitable number of sluices or valves of any suitable kind capable of dividing it into sections, separated so far as the passage of gas is concerned, each of such sections being arranged to communicate with one or two or more of the channels of the exchanger and so with one or more troughs or trays of the liquefier. Thus only one or two or any other desired number of the said channels may be allowed to communicate with the gas-holder for nitrogen or mixtures rich in nitrogen, connected to the upper end of the gas-collector, and only one or two or any other desired number of the said channels may be allowed to communicate with the gas-holder for oxygen or mixtures rich in oxygen, connected to the lower end of the gas-collector. The central portion of the gas-collector is provided with means for the escape of gaseous mixtures too nearly resembling atmospheric air, which it is not desirable to pass to either of the gas-holders aforesaid, and this means may conveniently be an opening, preferably triangular, which is arranged to be covered wholly or in part, as may be necessary from time to time, by a piston moved in one direction by the pressure of gas in the gas-collector and in the opposite direction by means of a weight or spring, thus affording means by which such gas as it may not be desirable to conduct to either of the gas-holders may be allowed to escape from the gas-collector, while an equal pressure is maintained in all the troughs or trays and in the gas-holders. The gas escaping from the gas-collector through the said opening may be allowed to pass to waste or may be utilized in any suitable manner—as, for instance, by being conducted to the compressor or compressors aforesaid.

The liquefier is provided with suitable windows of glass or mica or other suitable transparent material or telescopes arranged in a suitable way to permit persons to look into or through the apparatus and, if desirable or necessary, with any suitable means by which the interior may be illuminated, so that the operations proceeding within it may be ascertained and controlled, and in order that the low temperature within the liquefier shall not cause the windows or telescopes to be obscured by hoar-frost I arrange that there shall be near each window or telescope a small escape of cold dry air from the adjacent tray or trough.

If the liquefier and the exchanger be arranged as one apparatus or in close proximity, the walls separating or inclosing the channels of the exchanger may conveniently be made of less height than the trays or troughs of the liquefier connected to the said channels, the difference in height allowing space for any suitable material which is a non-conductor of heat and passage for the keys or handles used with the valves or sluices employed and the inspection of the operation through the windows or telescopes employed.

The liquid-collector aforesaid may be conveniently protected against receiving heat from the external air by being arranged within the liquefier or outside and close to it or by arranging that it shall pass through the walls of the channels of the exchanger. The liquefier and the exchanger, or either of them, are or is also protected in any suitable manner against receiving heat from outside.

The liquid air in flowing through the cylinders, troughs, or trays of the liquefier in succession gradually receives heat from the air passing inside the coils or pipes in the said troughs or trays, and so becomes evaporated or fractionally distilled into gas, the nitrogen passing into the gaseous state more readily than the oxygen, and thus the liquid as it approaches the lowest trough or tray of the liquefier becomes richer in oxygen and poorer in nitrogen, so that the liquid reaching the lowest trough or tray is liquid oxygen free or almost free from nitrogen, according to the manner in which the working of the apparatus may be regulated from time to time.

In order that there may be sufficient room in the apparatus for the storage of liquid oxygen, the lowest trough or tray is made of a larger capacity than the others, and in order that the working of the apparatus may be regulated automatically or otherwise I place a float in the liquid in the lowest tray or trough and connect such float with mechanical or electrical or other means by which as it moves downward or upward the speed of the compressor or compressors will be increased or reduced, or the flow of compressed air to the troughs or trays may be increased or diminished, or the said float may be arranged to effect or indicate the need for the regulation of the working of the apparatus in two or all of the said ways or in any other suitable manner.

The gas evolved in each tray or trough of the liquefier passes into the exchanger-channel connected to such tray or trough and in passing through such channel receives heat from and consequently effects the cooling of the air passing through the coil or pipe or coils or pipes in such channel.

It is necessary at the commencement of the operation to supply the troughs or trays of the liquefier with a charge of liquid air obtained in any suitable way; but afterward the apparatus may be made to work continuously, the compressed air losing heat and being liquefied in passing to and through the coils in the troughs or trays of the liquefier.

The liquefier and exchanger illustrated by Figs. 3, 4, 5, and 6 of the accompanying drawings are so arranged that the exchanger $s$ surrounds the liquefier $t$. In the case illustrated in the said figures the exchanger $s$ is constructed in ten sections $u$, each, in effect, a separate exchanger, and the liquefier $t$ is formed of ten trays $v$. In each of the ten sections $u$ of the exchanger $s$ is a group of eight pipes $w$, arranged in spiral form and united at one end with a single pipe $x$, provided with a cock $y$ and communicating with a vertical pipe or conduit $z$, receiving compressed air which has been passed through the dehydrater or dehydraters employed. At the other end the eight pipes $w$ of each section of the exchanger $s$ are united with a single pipe 2, connected to the coil 3 in the corresponding tray $v$ of the liquefier $t$. Each spiral group of pipes $w$ is arranged in a channel 4 of corresponding form arranged between walls 5, formed of wood or other material, with cotton, sawdust, tow, or cork or other suitable material inclosed within them, and this channel 4 is connected tightly to a nozzle 6, surrounding an opening 7 in the side of the corresponding tray $v$ of the liquefier $t$, in such a way that gas from the said tray $v$ may pass into the said channel 4 without leaking between the exterior of the liquefier $t$ and the interior of the exchanger $s$. The said channel 4 is also connected by a pipe 8 to a gas-collector 9, which at its upper end is in communication with a gas-holder of any suitable kind to receive nitrogen or mixtures of gases rich in nitrogen. At its lower end the gas-collector 9 is in communication with a gas-holder of any suitable kind to receive oxygen or mixtures of gases rich in oxygen.

The gas-collector 9 is provided with valves or sluices 10, there being one valve or sluice above or below the place at which each pipe 8 is connected to such gas-collector. The valves or sluices 10 enable more or fewer of the channels 4 to be placed in communication with or shut off from either of the two gas-holders aforesaid. In its central part the gas-collector 9 is connected to a pipe 11, which is square in transverse section and provided in a vertical part with a triangular orifice 12 and also provided with a square piston 13, capable of being slid up and down in it, so as to close or open more or less the triangular orifice 12. The piston 13 is arranged to receive a weight or weights 14, so that the pressure of gas requisite to move it upward or keep it stationary may be adjusted in the manner requisite.

Each tray $v$ of the liquefier $t$ except the lowest and highest is formed in the manner clearly indicated in Fig. 6 of metal plate and provided below with a circular foot 15 for insertion into the tray $v$ next below and above with an annular channel 16 to receive the foot 15 of the tray $v$ above. The lowest tray $v$ is closed at the bottom by a flat plate 17, and the uppermost tray is closed at the top by a plate 18, formed with flanges 19, by which the filters 20 for removing solid carbonic acid from the liquefied air are connected to the liquefier $t$. Valves or cocks 21 are provided to enable either filter 20 to be shut off from or placed in communication with the liquefier $t$. The coil 3 of each tray of the liquefier $t$, which being connected at one end, as already mentioned, to the corresponding coil $w$ of the exchanger $s$, is arranged in the lower part of the tray $v$, in which it is used and is connected at the other end by means of a pipe 22, provided with cock 23, with a collector 24 for liquid, which being formed of as many sections as there are trays $v$ is arranged to pass through the walls 5, separating parts of the channel 4 of each section $u$ of the exchanger $s$, and is closed at its lower end and is connected at its upper end to a pipe 25, formed with two branches, each provided with a cock or valve 26 and leading to one of the filters 20 for removing solid carbonic acid from the liquefied air. Each tray $v$ except the lowest is provided with a pipe 27, passing through its bottom and extending upward to a level somewhat higher than the upper surface of the coil 3 in the said tray $v$ and extending downward nearly to the bottom of the tray $v$ below, so as to enter suitably into a cup 28 placed therein, so that in the use of the apparatus the liquid in the cup 28 will seal or close the lower end of the pipe 27 and prevent gas from passing from one tray $v$ to another through the pipe 27. Each tray $v$ is provided with an aperture 7, already mentioned for connection with the channel 4 of the section $u$ of the exchanger $s$ used with it and also with an orifice 29 to receive a tube 30 after the several trays $v$ of the liquefier $t$ and the several sections $u$ of the exchanger $s$ have been placed in position. The said tube 30, as shown, is provided with two windows 31, of glass or mica or other suitable transparent material, so arranged that below one and above the other there is a little space by which cold dry gas from the tray $v$ may escape in order to keep the said windows 31 free from frost. A spring 32, secured to the tube 30, carries an electric lamp 33 in such a way that after yielding in the manner requisite to permit the tube 30 to be placed in position in the erection of the apparatus such spring 32 will raise the lamp 33 into such position that, in conjunction with a mirror 34, carried by the tray $v$ above it or in the case of the uppermost tray $v$ by the plate 18 thereof, will enable a person looking along the tube 30 to inspect the flow of liquefied air from one trough or tray $v$ to the next and the intensity of the evaporation of the liquefied air and ascertain whether any and what regulation of the working of the apparatus is necessary.

Instead of using tubes 30 with windows arranged to be used in conjunction with mirrors it is obvious that tubes with windows may be so arranged that it is possible to see through the apparatus from one side to the other.

In the lowest tray $v$ of the liquefier $t$, which is, as shown, made deeper than the others in order that there may be room for the accumulation of a store of liquid oxygen, which increasing or decreasing or remaining uniform in depth may serve as a means of indicating whether or not the apparatus is working properly or of effecting the control of the working of such apparatus. In the said lowest tray $v$ is placed a float 35, provided with a stem 36, passing through a guide 37, secured to the wall of the said tray $v$, and is provided with an arm 38, extending laterally into a box 39, the interior of which communicates with the interior of the said tray $v$ and is, as shown, provided with electrical contact-plates 40 and 41, so that the arm 38, touching one or other contact-plates, so as to complete an electrical circuit of which the arm 38 forms part, serves to indicate, for instance, by means of an electric bell, as shown in Fig. 7, that the level of the store of liquid oxygen in the said lowest tray $v$ has unduly increased or unduly decreased, and, if requisite, the completion of an electrical circuit by the contact of the arm 38 with one or other of the contact-plates 40 and 41 may be arranged to start an electric or other motor arranged to control the action of the air-compressor or air-compressors employed to supply compressed air to the pipe or conduit $z$. Each of the filters 20 for the separation of solid carbonic acid from the liquefied air is formed as a cylindrical casing 42, with two cylindrical perforated partitions 43 and 44, between which a layer of cotton-wool or filter-paper or other suitable filtering material 45 is placed so as to form a cylindrical filtering-chamber 46, into which the liquefied air to be filtered is made to enter at the center of one end from the pipe 25, used to supply such filter with liquid air. The said chamber 46 is closed by a lid 47, which also serves to shut off the space 46 within the partition 43 from that outside the partition 44, and is secured in position when the filter 20 is prepared for use by means of the handle 48 and the screw 49, which is arranged to bear against the lid 47 and made to engage with screw-threads in a cross-bar 50, arranged to hook upon projections on the exterior of the casing 42. The lid 47 being readily removable enables the solid carbonic acid accumulating in either filter 20 to be readily removed from time to time.

In the erection of the apparatus props or supports of any suitable kind may be placed between each section $u$ of the exchanger $s$ and the one below or above it in order that the said sections $u$ may remain in proper position.

When the trays $v$ of the liquefier $t$ and the sections $u$ of the exchanger $s$ have been placed in position, the spaces between the sections $u$ of the exchanger $s$ are preferably filled up with sawdust or other suitable material not readily conducting heat, tubes being arranged to permit the insertion of the tubes 30 and lamps 33 into position and to permit access to the handles 51 of the cocks or valves 23. The sawdust or other material between the sections $u$ of the exchanger $s$ is omitted from the drawings for the sake of simplicity.

When the apparatus is erected, a supply of liquid air sufficient to cover the coil 3 in each tray $v$ of the liquefier $t$ is introduced, and then the air-compressor or air-compressors employed being put in action air first filtered is compressed and forced through the dehydrater or dehydraters into the pipe or conduit $z$, and a portion of the air supplied to the pipe or conduit $z$ passes through the group of pipes $w$ in each section $u$ of the exchanger $s$, and so into the coil 3 in the corresponding tray $v$ of the liquefier $t$, while the liquid air in the said tray $v$ receives heat from the air forced into the said coil 3, and so becomes partially evaporated or fractionally distilled into gas, which passes through the opening 7 out of the said tray $v$ into the channel 4 of the corresponding section $u$ of the exchanger $s$, in passing through which it licks the outside of the group of pipes $w$ in the direction opposite to that in which air is forced through such pipes $w$ and receives heat therefrom and eventually passes into the gas-collector 9. The air being forced through the coils $w$ losing heat to the gas passing outside the groups of pipes $w$ becomes cooled and then losing further heat to the liquid air in the corresponding trays $v$ becomes liquefied in the coils 3, and thence passes to the liquid-collector 24, which leads it to one or other of the filters 20, where any solidified carbonic acid contained in it is deposited. From the filter or filters 20 the liquefied air passes into the uppermost tray $v$, and thence after being there partially evaporated to gas passes through the pipe 27, provided in the bottom of such tray $v$, to the tray $v$ next below, being there still further evaporated, and so on until it reaches the bottom tray $v$, being then substantially pure oxygen, having by that time parted with all or practically all its nitrogen, which is, as already mentioned, more volatile than the oxygen and so evaporates earlier. After the air begins to be liquefied in the coils 3 and to pass thence through the filter or filters 20 into the trays $v$ of the liquefier $t$ the apparatus continues its operation so long as the air-compressor or air-compressors is or are kept in operation, and as soon as the operation of the apparatus has proceeded long enough to enable liquid oxygen to fill the lowest tray $v$ sufficiently to support the float 35 the sluices or valves 10 may be opened or closed in the manner requisite to regulate the purity or otherwise of the gases led to the gas-holders from the gas-collector 9 and to permit the issue from the orifice 12 of the mixtures which are considered unsuitable for collection into either gas-holder because too nearly resembling atmospheric air. The cocks $y$ and 23 enable the action of the several sections $u$ of the exchanger $s$ and trays $v$ of the liquefier $t$ to be regulated as may be desirable and also enable one or more of such sections $u$ and trays $v$ to be rendered inoperative so far as the cooling and liquefaction of air are concerned.

Although I have hereinbefore described my invention as applied in the separation of the gases constituting air, it is obvious, and I would have it clearly understood, that my invention is applicable wholly or in part to the separation of the gases forming other gaseous mixtures and that in some cases some portions of the apparatus hereinbefore described may be dispensed with or replaced by other equivalent apparatus. I would also have it understood that in cases in which it may be desirable my invention may be used entirely or principally or to any desirable extent for the preparation of carbonic acid in the solid or liquid or compressed form by the apparatus employed being supplied with air to which carbonic acid is added in any form—such, for instance, as chimney-gases—or being supplied with chimney-gases or any other convenient mixture of gases containing carbonic acid in suitable proportion.

The arrangements of apparatus hereinbefore described enable the separation of gases, especially those forming the air, to be accomplished more economically than has been possible by the means hitherto provided and enable the separation of gases to be effected completely or to any extent which may be desirable from time to time.

What I claim, and desire to secure by Letters Patent, is—

1. In an apparatus for the separation of a gaseous mixture into its constituents by the liquefaction and subsequent evaporation or fractional distillation of such gaseous mixture in the manner hereinbefore described, the combination with a liquefier comprising a series of closed evaporator trays, troughs or sections, connected to permit passage of liquid through the series, and provided with conduits, in contact with liquid in such trays, for the passage of the gas to be liquefied, and with separate gas-outlets, of a plurality of heat-exchangers each having adjacent conduits for the passage of gas to be liquefied and for the gas escaping from the evaporator-trays, such conduits of the several exchangers being connected respectively to the corresponding conduits and outlets of different trays of the series; a source of supply of compressed gas to be liquefied, to which the corresponding conduits of the exchangers are connected in multiple, and means for collecting the liquefied mixture from the conduits of the several trays.

2. In an apparatus for the separation of a gaseous mixture into its constituents by the liquefaction and subsequent evaporation or fractional distillation of such gaseous mixture in the manner hereinbefore described, the combination with a liquefier comprising a series of closed evaporator trays, troughs or sections connected to permit passage of liquid through the series, but sealed against the passage of gas from one to the other, and provided with conduits, in contact with liquid in such trays, for the passage of the gas to be liquefied, and with separate gas-outlets, of a plurality of heat-exchangers, each having adjacent conduits for the passage of gas to be liquefied and for the gas escaping from the evaporator-trays, such conduits of the several exchangers being connected respectively to the corresponding conduits and outlets of different trays of the series; a source of supply of compressed gas to be liquefied, to which the corresponding conduits of the exchangers are connected in multiple, and means for collecting the liquefied mixture from the conduits of the several trays.

3. In an apparatus for the separation of a gaseous mixture into its constituents by the liquefaction and subsequent evaporation or fractional distillation of such gaseous mixture in the manner hereinbefore described, the combination, with a liquefier comprising a series of closed evaporator trays, troughs or sections, connected to permit passage of liquid through the series, and provided with conduits, in contact with liquid in such trays, for the passage of the gas to be liquefied, and with separate gas-outlets, of a plurality of heat-exchangers each having adjacent conduits for the passage of gas to be liquefied and for the gas escaping from the evaporator-trays, such conduits of the several exchangers being connected respectively to the corresponding conduits and outlets of different trays of the series; a source of supply of compressed gas to be liquefied to which the corresponding conduits of the exchangers are connected in multiple, means for collecting the liquefied mixture from the conduits of the several trays, and means for collecting the gases escaping from the several exchangers.

4. In an apparatus for the separation of a gaseous mixture into its constituents by the liquefaction and subsequent evaporation or fractional distillation of such gaseous mixture in the manner hereinbefore described, the combination with a liquefier comprising a series of closed evaporator trays, troughs or sections, connected to permit passage of liquid through the series and provided with conduits, in contact with liquid in such trays, for the passage of gas to be liquefied, and with separate gas-outlets, of a plurality of heat-exchangers surrounding the said liquefier and each having adjacent conduits for the passage of gas to be liquefied and for the gas escaping from the said evaporator-trays, the said conduits of the several exchangers being connected to the corresponding conduits and outlets of different evaporator-trays of the series; a source of supply of compressed gas to be liquefied, to which the corresponding conduits of the exchangers are connected in multiple, means for collecting the gas escaping from the several exchangers, and means for collecting the liquefied mixture from the conduits of the several trays.

5. In an apparatus for the separation of a gaseous mixture into its constituents by the liquefaction and subsequent evaporation or fractional distillation of such gaseous mixture in the manner hereinbefore described, the combination with a liquefier comprising a series of closed evaporator trays, troughs or sections connected to permit passage of liquid through the series, and provided with conduits, in contact with liquid in such trays, for the passage of the gas to be liquefied, and with separate gas-outlets, of a plurality of heat-exchangers each having adjacent conduits for the passage of gas to be liquefied and for the gas escaping from the evaporator-trays, such conduits of the several exchangers being connected respectively to the corresponding conduits and outlets of different trays of the series; a source of supply of compressed gas to be liquefied, to which the corresponding conduits of the exchangers are connected in multiple, and a collector into which the gas from the several exchangers is discharged, provided with means for separating gases discharged from the different exchangers of the series.

6. In an apparatus for the separation of a gaseous mixture into its constituents by the liquefaction and subsequent evaporation or fractional distillation of such gaseous mixture in the manner hereinbefore described, the combination with a liquefier comprising a series of closed evaporator trays, troughs, or sections connected to permit passage of liquid through the series, and provided with conduits, in contact with liquid in such trays, for the passage of the gas to be liquefied, and with separate gas-outlets, of a plurality of heat-exchangers each having adjacent conduits for the passage of gas to be liquefied and for the gas escaping from the evaporator-trays, such conduits of the several exchangers being connected respectively to the corresponding conduits and outlets of different trays of the series; a source of supply of compressed gas to be liquefied, to which the corresponding conduits of the exchangers are connected in multiple, a collector into which the gas from the several exchangers is discharged, and valves in said collector adapted to permit separation of gas flowing from different exchangers of the series.

7. In an apparatus for the separation of a gaseous mixture into its constituents by the liquefaction and subsequent evaporation or fractional distillation of such gaseous mixture in the manner hereinbefore described, the combination with a liquefier comprising a series of closed evaporator trays, troughs or sections, connected to permit passage of liquid through the series, and provided with conduits, in contact with liquid in such trays, for the passage of the gas to be liquefied, and with separate gas-outlets, of a plurality of heat-exchangers each having adjacent conduits for the passage of gas to be liquefied and for the gas escaping from the evaporator-trays, such conduits of the several exchangers being connected respectively to the corresponding conduits and outlets of different trays of the series; a source of supply of compressed gas to be liquefied, to which the corresponding conduits of the exchangers are connected in multiple, and means for collecting the liquefied mixture from the conduits of the several trays, and for conducting said mixture to the uppermost of said trays.

8. In an apparatus for the separation of a gaseous mixture into its constituents by the liquefaction and subsequent evaporation or fractional distillation of such gaseous mixture in the manner hereinbefore described, the combination with a liquefier comprising a series of closed evaporator trays, troughs or sections connected to permit passage of liquid through the series, but sealed against the passage of gas from one to the other, and provided with conduits, in contact with liquid in such trays, for the passage of the gas to be liquefied, and with separate gas-outlets, of a plurality of heat-exchangers, each having adjacent conduits for the passage of gas to be liquefied and for the gas escaping from the evaporator-trays, such conduits of the several exchangers being connected respectively to the corresponding conduits and outlets of different trays of the series; a source of supply of compressed gas to be liquefied, to which the corresponding conduits of the exchangers are connected in multiple, and means for collecting the liquefied mixture from the conduits of the several trays, and for conducting said mixture to the uppermost of said trays.

9. In an apparatus for the separation of a gaseous mixture into its constituents by the liquefaction and subsequent evaporation or fractional distillation of such gaseous mixture in the manner hereinbefore described, the combination, with a liquefier comprising a series of closed evaporator trays, troughs or sections, connected to permit passage of liquid through the series, and provided with conduits, in contact with liquid in such trays, for the passage of the gas to be liquefied, and with separate gas-outlets, of a plurality of heat-exchangers each having adjacent conduits for the passage of gas to be liquefied and for the gas escaping from the evaporator-trays, such conduits of the several exchangers being connected respectively to the corresponding conduits and outlets of different trays of the series; a source of supply of compressed gas to be liquefied to which the corresponding conduits of the exchangers are connected in multiple, means for collecting the liquefied mixture from the conduits of the several trays, and for conducting said mixture to the uppermost of said trays, and means for collecting the gases escaping from the several exchangers.

10. In an apparatus for the separation of a gaseous mixture into its constituents by the liquefaction and subsequent evaporation or fractional distillation of such gaseous mixture in the manner hereinbefore described, the combination with a liquefier comprising a series of closed evaporator trays, troughs or sections, connected to permit passage of liquid through the series and provided with conduits, in contact with liquid in such trays, for the passage of gas to be liquefied, and with separate gas-outlets, of a plurality of heat-exchangers surrounding the said liquefier and each having adjacent conduits for the passage of gas to be liquefied and for the gas escaping from the said evaporator-trays, the said conduits of the several exchangers being connected to the corresponding conduits and outlets of different evaporator-trays of the series; a source of supply of compressed gas to be liquefied, to which the corresponding conduits of the exchangers are connected in multiple, means for collecting the gas escaping from the several exchangers, and means for collecting the liquefied mixture from the conduits of the several trays, and for conducting said mixture to the uppermost of said trays.

11. In an apparatus for the separation of a gaseous mixture into its constituents by the liquefaction and subsequent evaporation or fractional distillation of such gaseous mixture in the manner hereinbefore described, the combination with a liquefier comprising a series of closed evaporator trays, troughs or sections connected to permit passage of liquid through the series, and provided with conduits, in contact with liquid in such trays, for the passage of the gas to be liquefied, and with separate gas-outlets, of a plurality of heat-exchangers each having adjacent conduits for the passage of gas to be liquefied and for the gas escaping from the evaporator-trays, such conduits of the several exchangers being connected respectively to the corresponding conduits and outlets of different trays of the series; a source of supply of compressed gas to be liquefied, to which the corresponding conduits of the exchangers are connected in multiple, a collector into which the gas from the several exchangers is discharged, provided with means for separating gases discharged from the different exchangers of the series, and means for collecting the liquefied mixture from the conduits of the several trays and for conveying said mixture to the uppermost of said trays.

12. In an apparatus for the separation of a gaseous mixture into its constituents by the liquefaction and subsequent evaporation or fractional distillation of such gaseous mixture in the manner hereinbefore described, the combination with a liquefier comprising a series of closed evaporator trays, troughs or sections connected to permit passage of liquid through the series, and provided with conduits, in contact with liquid in such trays, for the passage of the gas to be liquefied, and with separate gas-outlets, of a plurality of heat-exchangers each having adjacent conduits for the passage of gas to be liquefied and for the gas escaping from the evaporator-trays, such conduits of the several exchangers being connected respectively to the corresponding conduits and outlets of different trays of the series; a source of supply of compressed gas to be liquefied, to which the corresponding conduits of the exchangers are connected in multiple, a collector into which the gas from the several exchangers is discharged, valves in said collector adapted to permit separation of gas flowing from different exchangers of the series, and means for collecting the liquefied mixture from the conduits of the several trays and for conveying said mixture to the uppermost of said trays.

13. In an apparatus for the separation of a gaseous mixture into its constituents by the liquefaction and subsequent evaporation or fractional distillation of such gaseous mixture in the manner hereinbefore described, the combination with a liquefier comprising a series of closed evaporator trays, troughs or sections, connected to permit passage of liquid through the series, and provided with conduits, in contact with liquid in such trays, for the passage of the gas to be liquefied, and with separate gas-outlets, of a plurality of heat-exchangers each having adjacent conduits for the passage of gas to be liquefied and for the gas escaping from the evaporator-trays, such conduits of the several exchangers being connected respectively to the corresponding conduits and outlets of different trays of the series; a source of supply of compressed gas to be liquefied, to which the corresponding conduits of the exchangers are connected in multiple, and means for collecting the liquefied mixture from the conduits of the several trays, for filtering said mixture and for delivering the filtered liquid to the uppermost of said trays.

14. In an apparatus for the separation of a gaseous mixture into its constituents by the liquefaction and subsequent evaporation or fractional distillation of such gaseous mixture in the manner hereinbefore described, the combination with a liquefier comprising a series of closed evaporator trays, troughs or sections connected to permit passage of liquid through the series, but sealed against the passage of gas from one to the other, and provided with conduits, in contact with liquid in such trays, for the passage of the gas to be liquefied, and with separate gas-outlets, of a plurality of heat-exchangers, each having adjacent conduits for the passage of gas to be liquefied and for the gas escaping from the evaporator-trays, such conduits of the several exchangers being connected respectively to the corresponding conduits and outlets of different trays of the series; a source of supply of compressed gas to be liquefied, to which the corresponding conduits of the exchangers are connected in multiple, and means for collecting the liquefied mixture from the conduits of the several trays, for filtering said mixture and for delivering the filtered liquid to the uppermost of said trays.

15. In an apparatus for the separation of a gaseous mixture into its constituents by the liquefaction and subsequent evaporation or fractional distillation of such gaseous mixture in the manner hereinbefore described, the combination, with a liquefier comprising a series of closed evaporator trays, troughs or sections, connected to permit passage of liquid through the series, and provided with conduits, in contact with liquid in such trays, for the passage of the gas to be liquefied, and with separate gas-outlets, of a plurality of heat-exchangers, each having adjacent conduits for the passage of gas to be liquefied and for the gas escaping from the evaporator-trays, such conduits of the several exchangers being connected respectively to the corresponding conduits and outlets of different trays of the series; a source of supply of compressed gas to be liquefied to which the corresponding conduits of the exchangers are connected in multiple, means for collecting the liquefied mixture from the conduits of the several trays, for filtering the same, and for delivering the filtered liquid to the uppermost of said trays, and means for collecting the gases escaping from the several exchangers.

16. In an apparatus for the separation of a gaseous mixture into its constituents by the liquefaction and subsequent evaporation or fractional distillation of such gaseous mixture in the manner hereinbefore described, the combination with a liquefier comprising a series of closed evaporator trays, troughs or sections, connected to permit passage of liquid through the series and provided with conduits, in contact with liquid in such trays, for the passage of gas to be liquefied, and with separate gas-outlets, of a plurality of heat-exchangers surrounding the said liquefier and each having adjacent conduits for the passage of gas to be liquefied and for the gas escaping from the said evaporator-trays, the said conduits of the several exchangers being connected to the corresponding conduits and outlets of different evaporator-trays of the series; a source of supply of compressed gas to be liquefied, to which the corresponding conduits of the exchangers are connected in multiple, means for collecting the gas escaping from the several exchangers, and means for collecting the liquefied mixture from the conduits of the several trays for filtering the same and for delivering the filtered liquid to the uppermost of said trays.

17. In an apparatus for the separation of a gaseous mixture into its constituents by the liquefaction and subsequent evaporation or fractional distillation of such gaseous mixture in the manner hereinbefore described, the combination with a liquefier comprising a series of closed evaporator trays, troughs or sections connected to permit passage of liquid through the series, and provided with conduits, in contact with liquid in such trays, for the passage of the gas to be liquefied, and with separate gas-outlets, of a plurality of heat-exchangers each having adjacent conduits for the passage of gas to be liquefied and for the gas escaping from the evaporator-trays, such conduits of the several exchangers being connected respectively to the corresponding conduits and outlets of different trays of the series; a source of supply of compressed gas to be liquefied to which the corresponding conduits of the exchangers are connected in multiple, a collector into which the gas from the several exchangers is discharged, provided with means for separating gases discharged from the different exchangers of the series, and means for collecting the said liquid from the conduits of said trays, for filtering the same and for delivering the filtered liquid to the uppermost of said trays.

18. In an apparatus for the separation of a gaseous mixture into its constituents by the liquefaction and subsequent evaporation or fractional distillation of such gaseous mixture in the manner hereinbefore described, the combination with a liquefier comprising a series of closed evaporator trays, troughs or sections connected to permit passage of liquid through the series, and provided with conduits, in contact with liquid in such trays, for the passage of the gas to be liquefied, and with separate gas-outlets, of a plurality of heat-exchangers each having adjacent conduits for the passage of gas to be liquefied and for the gas escaping from the evaporator-trays, such conduits of the several exchangers being connected respectively to the corresponding conduits and outlets of different trays of the series; a source of supply of compressed gas to be liquefied, to which the corresponding conduits of the exchangers are connected in multiple, a collector into which the gas from the several exchangers is discharged, valves in said collector adapted to permit separation of gas flowing from different exchangers of the series, and means for collecting the said liquid from the conduits of said trays, for filtering the same and for delivering the filtered liquid to the uppermost of said trays.

19. In an apparatus for the separation of a gaseous mixture into its constituents by the liquefaction and subsequent evaporation or fractional distillation of such gaseous mixture in the manner hereinbefore described the combination with each trough or tray of the liquefier of a window to permit inspection of the interior of such trough or tray and of the flow of liquefied gaseous mixture from one trough or tray of the liquefier to the next and the intensity of the evaporation of the liquefied gaseous mixture and an outlet for cold dry gas adjacent to such window all for the purpose hereinbefore described.

20. In an apparatus for the separation of a gaseous mixture into its constituents by the liquefaction and subsequent evaporation or fractional distillation of such gaseous mixture in the manner hereinbefore described the combination with each trough or tray of the liquefier of a window and an outlet for cold dry gas adjacent to such window, a mirror and an electric lamp to act with such window to permit inspection of the interior of such trough or tray and of the flow of liquefied gaseous mixture from one trough or tray of the liquefier to the next and the intensity of the evaporation of the liquefied gaseous mixture all for the purpose hereinbefore described.

21. In an apparatus for the separation of a gaseous mixture into its constituents by liquefaction and subsequent evaporation or fractional distillation of such gaseous mixture, in the manner hereinbefore described, the combination with a liquefier comprising a plurality of evaporating-chambers arranged one above the other and connected in series and arranged to permit the flow of the liquefied gaseous mixture from one to the other but to prevent the flow of gas from one to the other, said series comprising intermediate chambers from which gaseous mixtures of different proportions may be obtained, and end chambers from which gases of relative purity may be obtained, of an exchanger comprising a plurality of sections arranged one above the other, surrounding the liquefier and each corresponding to one of the chambers of said liquefier, each exchanger-section having pipes, connected to its corresponding liquefier-chamber, through which the gaseous mixture to be cooled and eventually liquefied is made to pass, and having also channels to contain such pipes, each channel connected to the corresponding chamber of the liquefier.

22. In an apparatus for the separation of a gaseous mixture into its constituents by liquefaction and subsequent evaporation or fractional distillation of such gaseous mixture, in the manner hereinbefore described, the combination with a liquefier comprising a plurality of evaporating-chambers arranged one above the other and connected in series and arranged to permit the flow of the liquefied gaseous mixture from one to the other but to prevent the flow of gas from one to the other, said series comprising intermediate chambers from which gaseous mixtures of different proportions may be obtained, and end chambers from which gases of relative purity may be obtained, of an exchanger comprising a plurality of sections arranged one above the other, surrounding the liquefier, and each corresponding to one of the chambers of said liquefier, each exchanger-section having channels connected to the corresponding chamber of the liquefier and leading spirally outward therefrom for the escape of gas from said chamber, and having also pipes in such channels, connected to the corresponding liquefier-chamber, through which the gaseous mixture to be cooled and eventually liquefied is made to pass.

23. In an apparatus for the separation of a gaseous mixture into its constituents by the liquefaction and subsequent evaporation or fractional distillation of such gaseous mixture in the manner hereinbefore described, the combination of a plurality of sections of the apparatus adapted to resist pressure and arranged to be exposed to low temperatures in the operation of the apparatus and provided on adjacent sides with troughs adapted to contain water and with projections adapted to enter said troughs, whereby when water in such troughs is frozen the parts are secured together and means for producing within the apparatus a temperature below the freezing-point of the liquid in said troughs.

24. The combination with the troughs or trays of an exchanger for use in an apparatus for the separation of a gaseous mixture into its constituents by the liquefaction and subsequent evaporation or fractional distillation of such gaseous mixture in the manner hereinbefore described of feet upon some of such troughs or trays to enter into channels in the others of the said troughs or trays and channels upon the others of the said troughs or trays to receive the said feet and to receive water for the purpose hereinbefore described and means for producing within the apparatus a temperature lower than the freezing-point of the liquid within said channels.

25. In an apparatus for the separation of a gaseous mixture into its constituents by the liquefaction and subsequent evaporation or fractional distillation of such gaseous mixture in the manner hereinbefore described a liquefier consisting in the combination of a number of structurally-separate trays, means to permit the flow of liquid from tray to tray and preserve a quantity of liquid in each tray, ice-joints between the trays, and coils immersed in the liquid in said trays and serving for the liquefaction of gaseous mixture in their interiors and for the evaporation of the liquid in the said trays for the purpose hereinbefore described.

26. An apparatus for the separation of a gaseous mixture into its constituents by the liquefaction and subsequent evaporation or fractional distillation of such gaseous mixture in the manner hereinbefore described consisting essentially in the combination of an exchanger and liquefier containing respectively corresponding numbers of sections and trays or troughs varying as to number according to the degree of purity desired in the gases to be separated and collected, the sections containing pipes for the passage of the gaseous mixture to be liquefied and channels containing the said pipes and each in communication with one of the trays or troughs and the trays or troughs each in communication with the channel in the corresponding section and a coil in each tray or trough in communication with the pipe in the corresponding channel, a liquid-collector in communication with the said coils, means to regulate the flow of liquefied gaseous mixture from each of the said coils to the said liquid-collector, a filter in communication with the said liquid-collector and with the uppermost of the said trays or troughs, a float in the lowest of the said trays or troughs, a gas-collector in communication with the said channels and provided with an outlet for gases not desired to be collected, means to regulate the escape of gases thereby, means to regulate the number of the said channels which are allowed to communicate at any time with the outlet for gases which it is not desired to collect and the number of the said channels from which gases are to be conducted to the places to which the said gas-collector may be connected all for the purposes hereinbefore described.

27. An apparatus for the separation of a gaseous mixture into its constituents by the liquefaction and subsequent evaporation or fractional distillation of such gaseous mixture in the manner hereinbefore described consisting essentially in the combination of an exchanger and liquefier containing respectively corresponding numbers of sections and trays or troughs varying as to number according to the degree of purity desired in the gases to be separated and collected, the sections containing pipes for the passage of the gaseous mixture to be liquefied and channels containing the said pipes and each in communication with one of the trays or troughs and the trays or troughs each in communication with the channel in the corresponding section, and a coil in each tray or trough in communication with the pipe in the corresponding channel, a liquid-collector in communication with the said coils, means to regulate the flow of liquefied gaseous mixture from each of the said coils to the said liquid-collector a filter in communication with the said liquid-collector and with the uppermost of the said trays or troughs, means to shut off the said filter from the uppermost tray or trough, a float in the lowest of the said trays or troughs, a gas-collector in communication with the said channels and provided with an outlet for gases not desired to be collected, means to regulate the escape of gases thereby, means to regulate the number of the said channels which are allowed to communicate at any time with the outlet for gases which it is not desired to collect and the number of the said channels from which gases are to be conducted to the places to which the said gas-collector may be connected all for the purposes hereinbefore described.

28. An apparatus for the separation of a gaseous mixture into its constituents by the liquefaction and subsequent evaporation or fractional distillation of such gaseous mixture in the manner hereinbefore described consisting essentially in the combination of an exchanger and liquefier containing respectively corresponding numbers of sections and trays or troughs varying as to number according to the degree of purity desired in the gases to be separated and collected, the sections containing pipes for the passage of the gaseous mixtures to be liquefied and channels containing the said pipes and each in communication with one of the trays or troughs and the trays or troughs each in communication with the channel in the corresponding section and a coil in each tray or trough in communication with the pipe in the corresponding channel a liquid-collector in communication with the said coils, valves to regulate the flow of the liquefied gaseous mixture from each of the said coils to the said liquid-collector a filter in communication with the said liquid-collector and with the uppermost of the said trays or troughs a float in the lowest of the said trays or troughs, electric contacts to act in conjunction with the said float, a gas-collector in communication with the said channels and furnished with a triangular opening for the escape of gases not desired to be collected, a piston weighted to regulate the escape of gases thereby, valves to regulate the number of the said channels which are allowed to communicate at any time with the outlet for gases which it is not desired to collect and the number of the said channels from which the gases are to be conducted to the places to which the said gas-collector may be connected, all for the purpose hereinbefore described.

29. An apparatus for the separation of a gaseous mixture into its constituents by the liquefaction and subsequent evaporation or fractional distillation of such gaseous mixture in the manner hereinbefore described consisting essentially in the combination of an exchanger and liquefier containing respectively corresponding numbers of sections and trays or troughs varying as to number according to the degree of purity desired in the gases to be separated and collected, the sections containing pipes for the passage of the gaseous mixture to be liquefied and channels containing the said pipes and each in communication with one of the trays or troughs, and the trays or troughs each in communication with the channel in the corresponding section and a coil in each tray or trough in communication with the pipe in the corresponding channel, a liquid-collector in communication with the said coils, valves to regulate the flow of liquefied gaseous mixture from each of the said coils to the said liquid-collector, a filter in communication with the said liquid-collector and with the uppermost of the said trays or troughs, a valve to shut off the said filter from the uppermost tray or trough, a float in the lowest of the said trays or troughs, electric contacts to act in conjunction with the said float, a gas-collector in communication with the said channels, and furnished with a triangular opening for the escape of gases not desired to be collected, a piston weighted to regulate the escape of gases thereby, valves to regulate the number of the said channels which are allowed to communicate at any time with the outlet for gases which it is not desired to collect and the number of the said channels from which the gases are to be conducted to the places to which the said gas-collector may be connected, all for the purposes hereinbefore described.

30. An apparatus for the separation of a gaseous mixture into its constituents by the liquefaction and subsequent evaporation or fractional distillation of such gaseous mixture in the manner hereinbefore described consisting essentially in the combination of an exchanger and liquefier containing respectively numbers of sections and trays or troughs varying as to number according to the degree of purity desired in the gases to be separated and collected, the sections containing pipes for the passage of the gaseous mixture to be liquefied and channels containing the said pipes and each in communication with one of the trays or troughs and the trays or troughs each in communication with the channel in the corresponding section and a coil in each tray or trough in communication with the pipe in the corresponding channel, a liquid-collector in communication with the said coils, valves to regulate the flow of liquefied gaseous mixture from each of the said coils to the said liquid-collector, a filter in communication with the uppermost of the said trays or troughs, a float in the lowest of the said trays or troughs electrical contacts to act in conjunction with the said float means to permit inspection of the interiors of the said troughs or trays a gas-collector in communication with the said channels and provided with an outlet for gases not desired to be collected a piston to regulate the escape of gases thereby, means to regulate the number of the said channels which are allowed to communicate at any time with the outlet for gases which it is not desired to collect and the number of the said channels from which gases are to be conducted to the places to which the said gas-collector may be connected for the purposes hereinbefore described.

31. An apparatus for the separation of a gaseous mixture into its constituents by the liquefaction and subsequent evaporation or fractional distillation of such gaseous mixture in the manner hereinbefore described consisting essentially in the combination of an exchanger and liquefier containing respectively numbers of sections and trays or troughs varying as to number according to the degree of purity desired in the gases to be separated and collected, the sections containing pipes for the passage of the gaseous mixture to be liquefied and channels containing the said pipes and each in communication with one of the trays or troughs and the trays or troughs each in communication with the channel in the corresponding section and a coil in each tray or trough in communication with the pipe in the corresponding channel, a liquid-collector in communication with the said coils, valves to regulate the flow of liquefied gaseous mixture from each of the said coils to the said liquid-collector, a filter in communication with the uppermost of the said trays or troughs, means to regulate the flow of liquefied gaseous mixture to the said filter, means to shut off the said filter from the uppermost tray or trough, a float in the lowest of the said trays or troughs, electrical contacts to act in conjunction with the said float, means to permit inspection of the interiors of the said troughs or trays, a gas-collector in communication with the said channels, and provided with an outlet for gases not desired to be collected a piston to regulate the escape of gases thereby, means to regulate the number of the said channels which are allowed to communicate at any time with the outlet for gases which it is not desired to collect and the number of the said channels from which gases are to be conducted to the places to which the said gas-collector may be connected for the purposes hereinbefore described.

32. An apparatus for the separation of a gaseous mixture into its constituents by the liquefaction and subsequent evaporation or fractional distillation of such gaseous mixture in the manner hereinbefore described consisting essentially in the combination of an exchanger and liquefier containing respectively numbers of sections and trays or troughs varying as to number according to the degree of purity desired in the gases to be separated and collected, the sections containing pipes for the passage of the gaseous mixture to be liquefied and channels containing the said pipes and each in communication with one of the trays or troughs and the trays or troughs each in communication with the channel in the corresponding section and a coil in each trough or tray in communication with the pipe in the corresponding channel a liquid-collector in communication with the said coils, valves to regulate the flow of liquefied gaseous mixture from each of the said coils to the said liquid-collector, filters in communication with the uppermost of the said troughs or trays means to regulate the flow of liquefied gaseous mixture to the said filters, means to shut off the said filters from the uppermost trough or tray a float in the lowest of the said trays or troughs, electrical contacts to act in conjunction with the said float, means to permit inspection of the interiors of the said troughs or trays, a gas-collector in communication with the said channels and provided with an outlet for gases not desired to be collected means to regulate the escape of gases thereby, means to regulate the number of the said channels which are allowed to communicate at any time with the outlet for gases which it is not desired to collect and the number of the said channels from which gases are to be conducted to the places to which the said gas-collector may be connected for the purposes hereinbefore described.

33. An apparatus for the separation of a gaseous mixture into its constituents by the liquefaction and subsequent evaporation or fractional distillation of such gaseous mixture in the manner hereinbefore described consisting essentially in the combination of an exchanger and liquefier containing respectively numbers of sections and trays or troughs varying as to number according to the degree of purity desired in the gases to be separated and collected, the sections containing pipes for the passage of the gaseous mixture to be liquefied and channels containing the said pipes and each in communication with one of the trays or troughs and the trays or troughs each in communication with the channel in the corresponding section and a coil in each trough or tray in communication with the pipe in the corresponding channel a liquid-collector in communication with the said coils, valves to regulate the flow of liquefied gaseous mixture from each of the said coils to the said liquid-collector filters in communication with the uppermost of the said troughs or trays means to regulate the flow of liquefied gaseous mixture to the said filters, means to shut off the said filters from the uppermost tray or trough a float in the lowest of the said trays or troughs, electrical contacts to act in conjunction with the said float means to permit inspection of the interiors of the said troughs or trays, a gas-collector in communication with the said channels and provided with an outlet for gases not desired to be collected, a piston to regulate the escape of gases thereby means to regulate the number of the said channels which are allowed to communicate at any time with the outlet for gases which it is not desired to collect and the number of the said channels from which gases are to be conducted to the places to which the said gas-collector may be connected for the purposes hereinbefore described.

34. An apparatus for the separation of a gaseous mixture into its constituents by the liquefaction and subsequent evaporation or fractional distillation of such gaseous mixture in the manner hereinbefore described consisting essentially in the combination of an exchanger and liquefier containing respectively corresponding numbers of sections and trays or troughs varying as to number according to the degree of purity desired in the gases to be separated and collected, the sections containing pipes for the passage of the gaseous mixture to be liquefied and channels containing the said pipes and each in communication with one of the trays or troughs and the trays or troughs each in communication with the channel in the corresponding section and a coil in each tray or trough in communication with the pipe in the corresponding channel, a liquid-collector in communication with the said coils, valves to regulate the flow of liquefied gaseous mixture from each of the said coils to the said liquid-collector, filters in communication with the said liquid-collector and with the uppermost of the said trays or troughs valves to shut off the said filters from the uppermost tray or trough, a float in the lowest of the said trays or troughs, electric contacts to act in conjunction with the said float, a gas-collector in communication with the said channels and furnished with an opening for the escape of gases not desired to be collected, means to regulate the escape of gases thereby, valves to regulate the number of the said channels which are allowed to communicate at any time with the outlet for gases which it is not desired to collect and the number of the said channels from which gases are to be conducted to the places to which the said gas-collector may be connected all for the purposes hereinbefore described.

35. An apparatus for the separation of a gaseous mixture into its constituents by the liquefaction and subsequent evaporation or fractional distillation of such gaseous mixture in the manner hereinbefore described consisting essentially in the combination of an exchanger and liquefier containing respectively corresponding numbers of sections and trays or troughs varying as to number according to the degree of purity desired in the gases to be separated and collected, the sections containing pipes for the passage of the gaseous mixture to be liquefied and channels containing the said pipes and each in communication with one of the trays or troughs and the trays or troughs each in communication with the channel in the corresponding section and a coil in each tray or trough in communication with the pipe in the corresponding channel, a liquid-collector in communication with the said coils, valves to regulate the flow of the liquefied gaseous mixture from each of the said coils to the said liquid-collector filters in communication with the said liquid-collector and with the uppermost of the said trays or troughs, valves to shut off the said filters from the uppermost tray or trough, a float in the lowest of the said trays or troughs, electric contacts to act in conjunction with the said float a gas-collector in communication with the said channels and furnished with an opening for the escape of gases not desired to be collected automatic means to regulate the escape of gases thereby, valves to regulate the number of the said channels which are allowed to communicate at any time with the outlet for gases which it is not desired to collect and the number of the said channels from which gases are to be conducted to the places to which the said gas-collector may be connected, all for the purposes hereinbefore described.

In testimony that I claim the foregoing as my invention I have signed my name, in presence of two witnesses, this 15th day of May, 1901.

RAOUL PIERRE PICTET.

Witnesses:
ERNALD SIMPSON MOSELEY,
ARTHUR VERNON BATHO.